Aug. 10, 1965

G. L. LOOMIS 3,199,598

APPARATUS FOR TESTING AND REPAIRING WELL PIPES

Filed July 2, 1962

INVENTOR
GLENN L. LOOMIS

BY Cushman, Darby & Cushman
ATTORNEYS

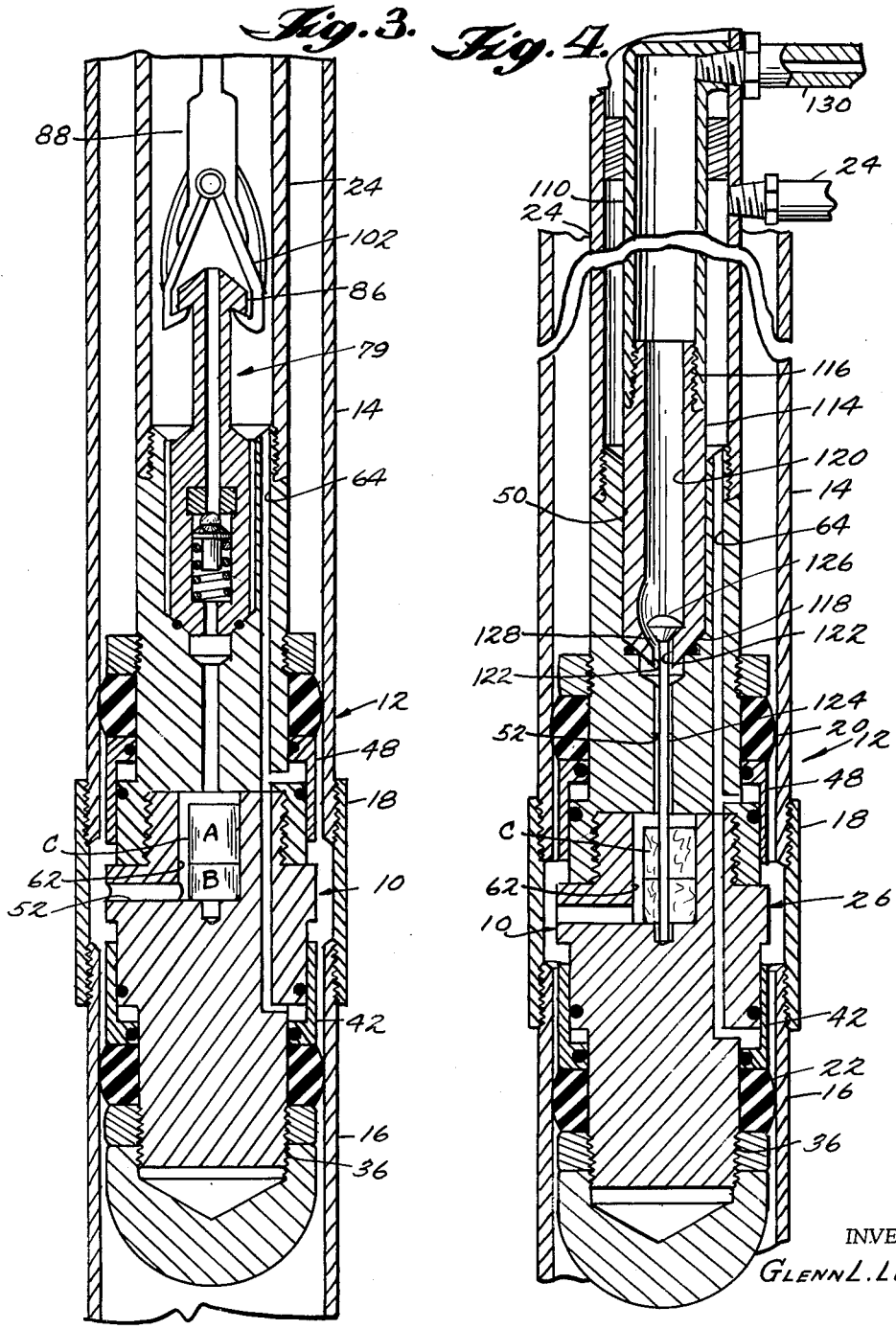

Aug. 10, 1965  G. L. LOOMIS  3,199,598
APPARATUS FOR TESTING AND REPAIRING WELL PIPES
Filed July 2, 1962  4 Sheets-Sheet 3
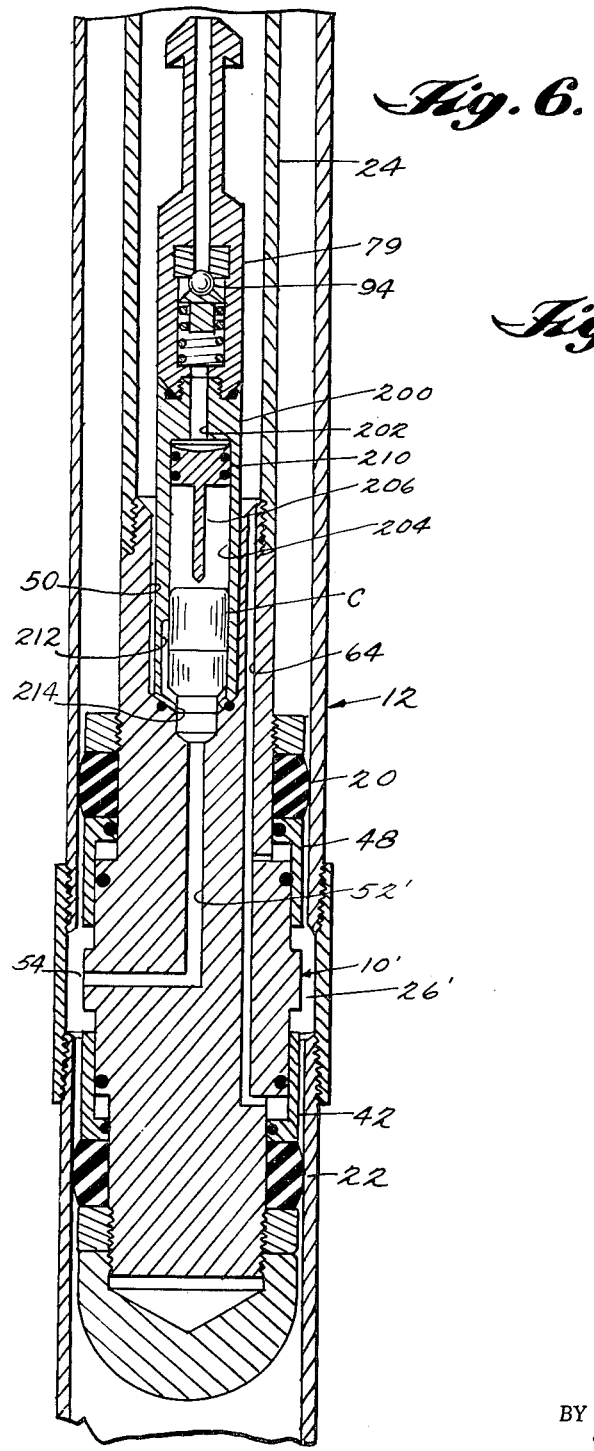
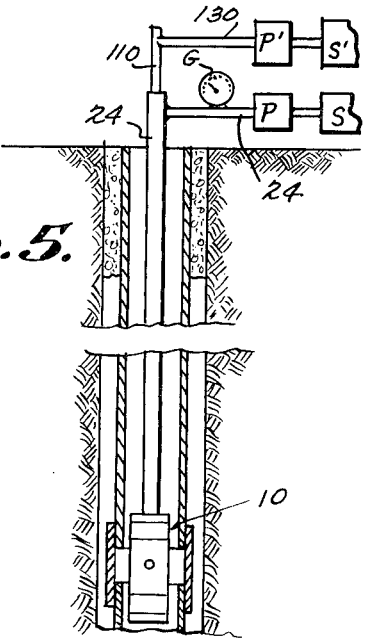
INVENTOR
GLENN L. LOOMIS
BY Cushman, Darby & Cushman
ATTORNEYS

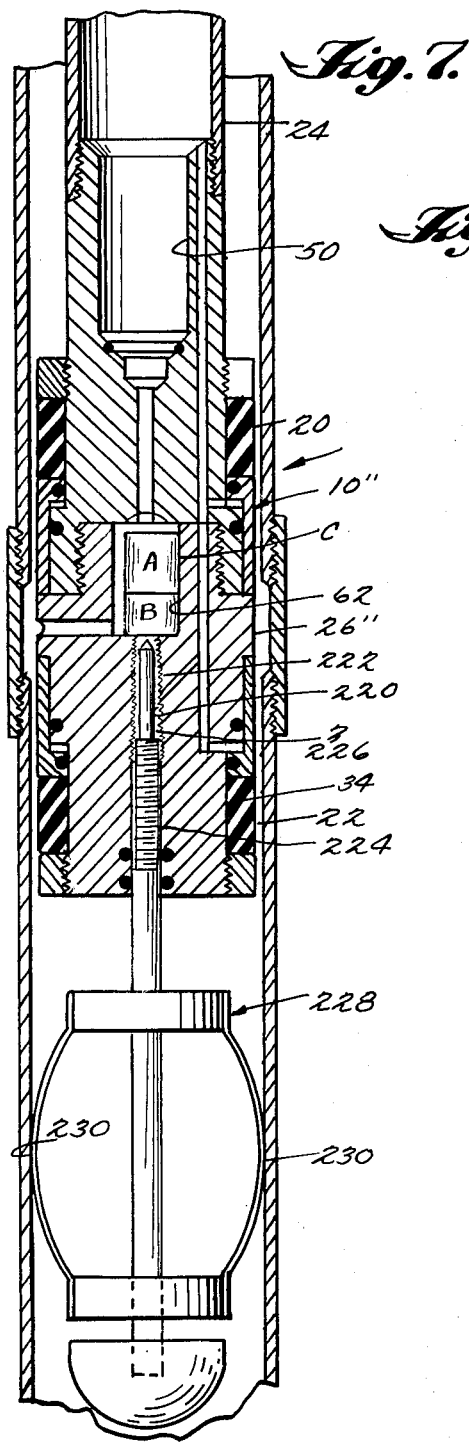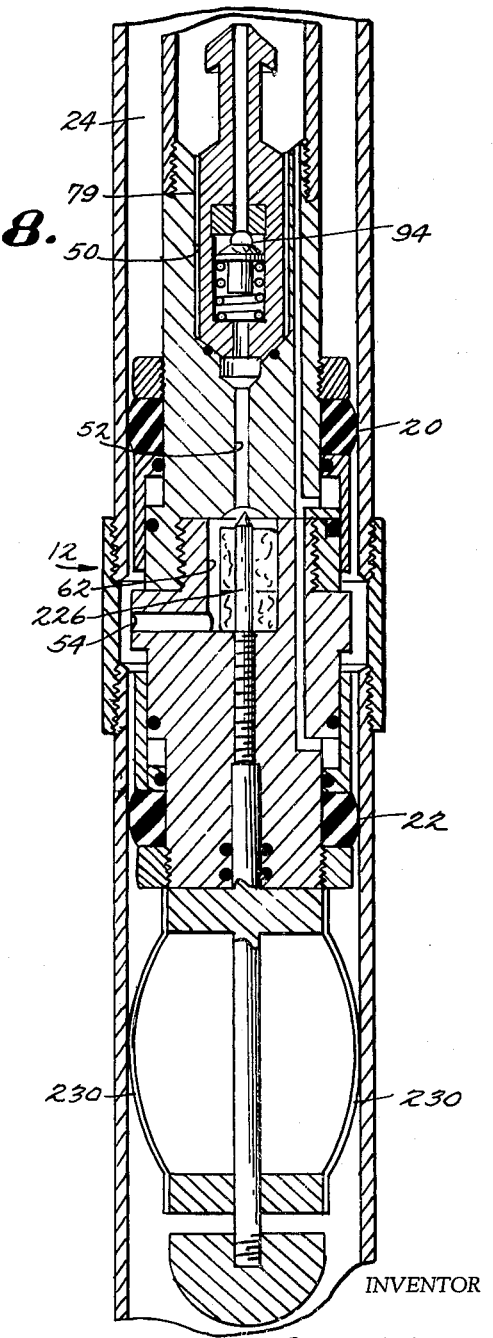

United States Patent Office 3,199,598
Patented Aug. 10, 1965

3,199,598
APPARATUS FOR TESTING AND REPAIRING
WELL PIPES
Glenn L. Loomis, Pasadena, Tex.; Jean Doyle Loomis, executrix of said Glenn L. Loomis, deceased, assignor to Jean Doyle Loomis
Filed July 2, 1962, Ser. No. 206,631
19 Claims. (Cl. 166—147)

The present invention relates to an apparatus for testing well tubing or pipe for leaks and repairing any leaks located. More specifically, the present invention relates to an apparatus for testing well pipe in a well to locate leaks and then repairing the well pipe in situ.

Present day gas and oil wells are completed by a procedure of cementing the final production tubing string into the well bore. This completion practice is usually done in order to eliminate additional expense of primary strings of casing, production packers and the like.

While the practice of cementing the final production tubing into the well bore has the advantage of being more economical, there is also the disadvantage that the tubing cannot be easily pulled for repairs should leaks develop either in the threaded joints of the connecting collars or in the tubing wall. Oftentimes, leaks develop long after the initial completion of the well and while the well is in use. Uncontrollable factors such as corrosion of the tubing or vibration of the same cause such leaks and, heretofore, there has been no satisfactory way to locate and repair the leaks without pulling the tubing out of the well hole and replacing the defective well pipe and/or threaded collars. Even in wells where the flow tubing or pipe may be easily removed to test for leaks and repair of the same, such procedure oftentimes results in further leaks developing in the joints when the string is lowered again into the well. This results in loss of operating time as the string must again be removed and repaired.

Efforts have been made to apply sealants to leaks located in well pipe by pumping the sealant down the well pipe to the area of the leak. Since the sealants include a plastic sealant material which must be mixed with a catalyst, the mixing of the plastic sealant material with the catalyst at the surface has proved an unsatisfactory operation as the catalytic action oftentimes takes place long before the sealant reaches the point of leakage within the well. The well pipe, equipment in the wells and the like becomes clogged by such a procedure.

An important object of the present invention is to provide an apparatus for locating leaks in a well pipe and repairing such leaks in situ.

A further object of the present invention is to provide an apparatus capable of testing a well pipe in a well in given increments, one above another, until a leak is located, the apparatus including means for repairing any located leak without removal of the apparatus from the well pipe.

A still further object of the present invention is to provide a tool which may be utilized for both testing for and repairing a leak in well pipe, the apparatus carrying a batch of sealant which may be applied to an area where a leak is located.

Another object of the present invention is to provide an apparatus for testing a section of well pipe for leaks by utilizing spaced barriers set by fluid pressure, means for applying measurable fluid pressure between the spaced barriers and means for applying a sealant to an area having a leak, the apparatus being so arranged that the sealant does not foul the inside mechanism of the apparatus or the well pipe.

A further object of the present invention is to provide an apparatus for sequentially testing sections of well pipe for leaks, the apparatus having means for repairing any leaks located without removal of the same from the well pipe or casing being tested.

Still another object of the present invention is to provide an apparatus for locating and repairing leaks in well pipe which may be lowered down the well pipe and which may be utilized to circulate fluid prior to testing so as to clean out or displace congealed weighing material, the fluid circulation from the apparatus being such that the well pipe is cleaned as the apparatus is lowered. By providing fluid circulation in the well pipe without setting the barriers of the apparatus, the apparatus may be lowered down the tubing string without difficulty to the area where the tests are to be conducted. Once lowered to the proper depth, the test for leaks and repairs may be accomplished in a satisfactory manner.

Throughout the specification, the term "well pipe" will be used, and it is intended to cover either a casing in a well bore or a string of flow tubing positioned within the casing. In drilling a well, the walls of the bore or hole are supported by what is commonly referred to as casing. The tubular casing, which comes in long sections, is lowered into the well after the well hole has been drilled, the sections of the casing being coupled together in the usual manner by a welded or threaded joint. The flow tubing is inserted within the casing after the casing has been inserted into the well bore. When the apparatus is used in testing flow tubing, the flow tubing remains in situ within the casing. On the other hand, when the apparatus is used to test casings for leaks, it will be understood that the flow tubing will have been either not inserted therein or removed from the casing to permit the insertion of the apparatus into the casing.

Although the apparatus is primarily intended to test and repair well pipe while the well pipe is within the well bore, it will be appreciated that the apparatus could be utilized to test well pipe removed from the bore and positioned in the derrick.

These and other objects and advantages of the present invention will appear more fully in the following specification, claims and drawings in which:

FIGURE 3 is a view similar to FIGURE 2 but showing an additional sequence in the operation of the apparatus of the present invention after the testing of a section of well pipe has been accomplished and prior to fixing or repairing a leak located in the section;

FIGURE 4 is a further vertical section similar to FIGURE 3 but showing the apparatus being utilized to repair the leak located;

FIGURE 5 is a schematic view of the apparatus of FIGURES 1, 2, 3 and 4 and showing the apparatus suspended in a well just prior to the repairing of a leak located in the well pipe;

FIGURE 6 is a vertical sectional view through an apparatus similar to the apparatus of FIGURES 1 through 5 but illustrating a modified means for holding the frangible capsule filled with sealant and a modified means for fracturing such capsule;

FIGURE 7 is a vertical sectional view of a still further modification of the present invention and illustrating a further modified means for fracturing the capsule having the sealant;

FIGURE 8 is a vertical sectional view of the apparatus of FIGURE 7 and illustrating the actuation of the means for fracturing or rupturing the capsule.

Figure 1:
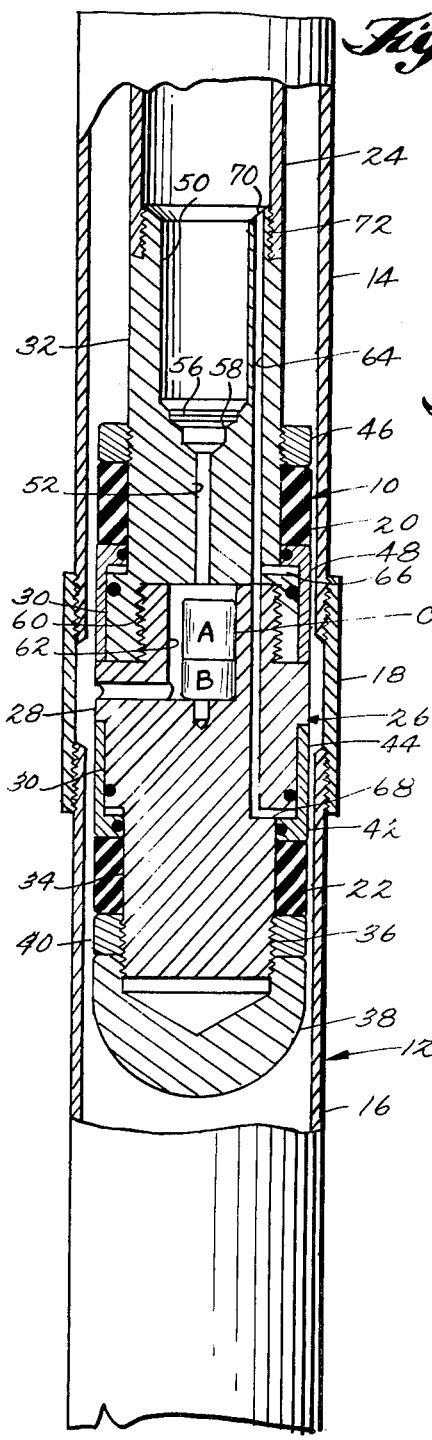
FIGURE 1 is a vertical section partly in elevation of the apparatus being inserted down into a well pipe.

Referring now to the drawings wherein like character and reference numerals represent like or similar parts, the apparatus of the present invention as illustrated in FIGURES 1 through 5 is generally designated by numeral 10. As shown in FIGURES 1 through 4, the apparatus 10 is illustrated positioned in a well pipe 12 which may be casing for a well hole or flow tubing inserted within the casing. It will be understood that in the example illustrated, the well pipe 12 is made up of a series of stands or sections 14 and 16 coupled together by a threaded collar 18. The illustrative example discloses the testing of the threaded joint between the two stands, but it will be appreciated that the apparatus is also used to test the walls of the stands intermediate the collars coupling the stands together.

The improved apparatus for testing the well pipe for leaks and/or repairing the well pipe for leaks in situ is best understood by referring to FIGURES 1 through 5. For the present, it will suffice to say that the testing apparatus 10 is provided with an upper resilient packer element 20 and a lower resilient packer element 22 which are spaced from each other and which are adapted to be expanded into sealing engagement with the interior of the well pipe by the application of fluid under pressure.

After the packer elements 20 and 22 have been set to form spaced barriers within the well pipe 12, a testing fluid such as water or the like is flowed into the area between the spaced barriers and a measurable pressure is applied thereto. Observation of a pressure gauge G (FIGURE 5), which measures the pressure on the liquid between the barriers, will determine if there is a leak in the section of pipe between the barriers. If there is an appreciable drop from the pressure as indicated by the gauge G, then there is a leak. If the test indicates a leak, the pressure on the fluid between the barriers is relieved and the barriers are released so that any liquid trapped therebetween can drop by gravity into the well. Then the barriers are reset and a frangible capsule C having a batch of sealant therein and supported in the area of the leak is fractured and the sealant is flowed into the space between the barriers. Fluid pressure is applied to the sealant to inject the same into the leaks, the fluid pressure being either water, salt water, barium impregnated mud, drilling mud, or the like. Once the sealant has been injected into the leak and has set, the barriers are released and the apparatus is moved to another position within the well pipe and the test sequence is repeated. A more detailed explanation of the method involved in the present invention will appear later in the specification together with the description of the apparatus.

The apparatus 10 of FIGURES 1 through 5 inclusive includes a pump P (FIGURE 5) suitably supported on the floor of a well derrick or the like (not shown), a source of supply S of liquid such as water, a flexible conduit 24 connecting the pump P and the source of supply S to an elongated body structure 26. The elongated body structure 26 has a maximum diameter less than the inside diameter of the well pipe 12 and is adapted to support the packer elements 20 and 22. Packer elements 20 and 222 are resilient and are adapted to be expanded into engagement with the well pipe 12. The resilient packer elements 20 and 22 are usually made from elastomeric material such as rubber, synthetic rubber or the like and may be of the type as shown in the drawings which are compressed longitudinally so that they expand transversely into sealing engagement with the wall of the well pipe 12 or they may be of the type which are provided with an internal cavity and can be inflated.

In more detail, the elongated body structure 26 is provided with a cylindrical center portion 28, intermediate portions 30 of reduced diameter and upper and lower elongated end portions 32 and 34, respectively, of still further reduced diameter. The lower end portion 34 is threaded as indicated at 36 and is adapted to receive a rounded nose member 38 and a packer retaining nut or back-up ring 40 which abuts against one end of the lower packer element 22. A cylindrical cup-shaped piston 42 is provided on the lower end portion 34 and abuts the packer element 22 on its end opposite to the end abutting the retaining nut 40. The cup-shaped piston 42 is provided with a cylindrical skirt 44 which is adapted to slide on the lower intermediate portion 30. It will now be understood that when the piston 42 moves downwardly from the position shown in FIGURE 1 against the packer element 22, it will compress the resilient packer element against the nut or back-up ring 40 and expand the same transversely into engagement with the well pipe 12 as shown in FIGURE 2.

The upper packer element 20 is mounted on the upper elongated end portion 32 in a similar manner between the back-up ring or retaining nut 46 and cylindrical cup-shaped piston 48. Movement of the piston 48 toward the retaining nut 46 compresses the packer element 20 and expands the same transversely into sealing engagement with the well pipe 12.

The construction and operation of the pistons 42 and 48 and the packer elements 22 and 20 respectively is substantially identical with that disclosed in my previously issued United States Patent 2,841,007, July 1, 1958, but it will be appreciated that the exact form of the packer elements and the use of fluid pressure to set the same may be in accordance with the teachings of my United States Patent 2,807,955, issued October 1, 1957.

The upper elongated end portion 32 is provided with an open ended enlarged bore 50 which extends axially thereof and which communicates with a passage 52 extending through the body structure and opening on the surface of the center portion 28 as indicated at 54. An O-ring seal 56 is provided in the shouldered bottom 58 of bore 50. Also, it will be noted that the body structure 26 is made in at least two parts and threaded together as indicated at 60 in order that an enlarged chamber 62 can be provided in the passage 52. The chamber 62 is adapted to support the frangible capsule C which houses the batch of sealant as will be described in more detail later in the specification.

The elongated upper end portion 32 is provided with a passage 64 which extends therethrough and through the intermediate portions 30, center portion 28 and lower end portion 34 and opens at 66 and 68 beneath the heads of pistons 48 and 42, respectively. The passage 64 where it passes through the upper end portion 32 is spaced radially outwardly of the bore 50 and passage 52. The passage 64 has an inlet 70 in the end of the end portion 64. As clearly shown in FIGURE 1, the flexible conduit 24 is threaded onto the end of the upper elongated end portion 32, as indicated at 72, and thus the body structure can be raised and lowered within the well tube.

When liquid from the source of supply S (FIGURE 5) is supplied through the pump P into the conduit 24 and into the bore 50, the liquid will flow downwardly through the passage 52 in the body structure 26 around the capsule C in the chamber 62 and out of the outlet 54 into the well. The liquid will also flow into the inlet 70 of passage 64 but since the pressure cannot build up in this passage as passage 52 is continuously open, the pistons 48 and 42 are not actuated. When the apparatus is first lowered into the well and liquid is flowed through the conduit 24 as described above, the liquid passes from the outlet 54 into the well pipe past the packers 20 and 22 and, thus, washes away or cleans out any congealed weighting material, mud or the like in the well pipe 12. The apparatus may then be conveniently lowered through the well pipe until it has reached a desired depth.

After the apparatus 10 has been positioned in the well pipe 12 as far down as desired, it is then ready for performing a test to determine if the well pipe at that position leaks and if such a leak is determined it then can be utilized to repair such a leak.

Figure 2:
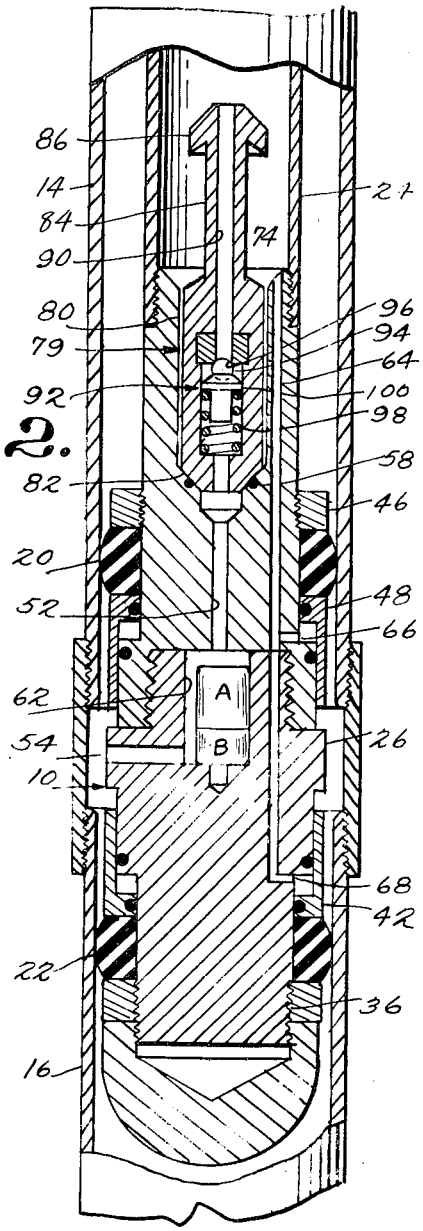
FIGURE 2 is a vertical sectional view similar to FIGURE 1 but illustrating the apparatus positioned at a desired location within the well pipe, the spaced barriers of the apparatus being set by fluid pressure and the apparatus ready for application of fluid under a measurable pressure to the space between the barriers.

Referring now to FIGURE 2, the apparatus of FIGURE 1 is shown ready to conduct a test on the section of well pipe. In more detail, after the cleansing and lowering action is accomplished as described with respect to FIGURE 1, the pump P is stopped and the liquid within the conduit 24 and in the body structure 28 will drain therefrom. The conduit 24 is temporarily disconnected from the pump P in any suitable manner and a pressure responsive valve assembly 79 is dropped down the conduit and fits into the bore 50 seating against the O-ring 56. The pressure responsive valve assembly 79 includes a body portion 80 having a beveled lower end or seat 82 and an elongated stem 84 extending from its upper end. The stem 84 is provided with an enlarged head 86 capable of receiving suitable overshot grapples 88 (FIGURE 3). A passage 90 extends through the stem 84 and body 80 and has its lower end communicating with the upper end of the passage 52. Housed within the body 80 is a pressure responsive valve 92 including a ball 94 urged against a seat 96 by a spring 98 and a follower 100.

With the pressure responsive valve assembly 79 in the position shown in FIGURE 2, the conduit 24 is again connected to the pump P and the pump is operated to supply liquid under pressure through the conduit 24 to the body structure 26. The ball 94 closes the passage 90 and, consequently, the liquid will first flow through the inlet 74 into the passage 64 at a sufficient pressure to urge the pistons 48 and 42 in opposite directions to thereby set the packers 20 and 22 respectively. Once the pressure in the passage 64 has caused the packer elements 20 and 22 to be set and form spaced barriers in the well pipe 12, the pressure of the liquid in the pipe 24 is increased. When the pressure of the liquid has increased sufficiently to unseat the ball 94 from its seat 96, the liquid will flow through the passage 90, passage 52 and out of the outlet 54 between the packer elements. The gauge G, provided adjacent the pump P can be observed as the pressure of the liquid between the packer elements 20 and 22 is built up to a predetermined amount. Once the pressure of the liquid has reached the predetermined amount, the gauge is observed for an appreciable drop in pressure and, if such a drop occurs, it will indicate that the section of well pipe being tested has a leak therein.

If the operator notes that there is a leak, the pressure of the liquid flowing into the conduit 24 is relieved and thus the ball 94 will seat and the pistons 48 and 42 retract so that any liquid trapped between the barriers can drop by gravity down the well pipe.

Referring now to FIGURE 3, the conduit 24 is again disconnected and the overshot grapple 88 which includes the spring tongs 102 is lowered into the conduit 24 until it engages the enlarged head 86 of the pressure responsive valve assembly 79. The valve assembly 79 is removed from the bore 50 and any liquid trapped in the passages 52 will flow by gravity therefrom out of the outlet 54 past the lower packer element 22. While FIGURE 3 shows the packer elements expanded, it will be appreciated that before the pressure responsive valve assembly 79 is removed, the packer elements will have become relaxed due to the removal of pressure from the liquid in the conduit 24. If for any reason there is fluid trapped between the packer elements which would tend to maintain the packer elements in sealing engagement, removal of the pressure responsive valve assembly 79 will cause an equalization of pressure on the fluid between the packer elements and the pressure beneath the pistons 48 and 42, thus causing an immediate full relaxing of the packer elements so that the liquid can drop into the well.

After the pressure responsive valve assembly has been removed, the apparatus will again assume the relaxed position shown in FIGURE 1. A second conduit 110 having a tubular member 114 threaded thereon, as indicated at 116, is then lowered within the conduit 24 until the lower beveled end 118 of the tubular member 114 seats against the O-ring 58 in the bottom of the bore 50. The tubular member 114 is provided with an enlarged bore 120 communicating with a reduced bore 122 at its lower end. A lance element 124 having a piston head 126 slidable in the bore 120 is adapted to extend through the bore 122 and the passageway 52 in the body structure 26. A by-pass passage 128 is provided between the bore 120 and the passage 122 so that liquid can flow past the piston head 126 through the passage 52 when the piston head is in the position shown in FIGURE 4.

When the conduit 110 with a tubular member 114 and its lance element 124 have been lowered within the conduit 24, the upper end of the conduit 110 is connected to a pipe 130 leading from a pump P' suitably supported on the floor of the derrick. The pump P' is connected to a source of supply S' which may be water, salt water, drilling mud, or barium impregnated mud.

With the apparatus connected as shown in FIGURE 4 but with the lance element 124 positioned vertically upwardly in the bore 120, the conduit 24 is reconnected to the pump P which is then started so as to flow water under pressure down the conduit 24 into the passage 64 and this actuates the pistons 48 and 42 to reset the packer elements 20 and 22 respectively. Once the packer elements have been reset, then the pump P' is actuated to cause flow of fluid in the conduit 110. The pressure of the fluid acting on the piston head 126 of the lance element 124 drives the same downwardly to a position where it penetrates the capsule C. Continued application of pressure on the head 126 will move the head to the position shown in FIGURE 4 and then the liquid in the bore can by-pass around the head through the by-pass passage 128 into the passage 52 and thus force the sealant out of the fractured capsule C and inject the same into the leak in the well pipe. As soon as it is determined that the sealant has been injected into the leak in the well pipe, the pressure can be relieved on the packers 20 and 22 and in the conduit 110 so that the conduit 110 may be raised upwardly so as to remove the tubular member 114 from the seat 58. After the pressure has been relieved on the packers 20 and 22, water may be flowed through the conduit 24 to clean out the passages 52, chamber 62 and the body structure 26 may then be raised so that a new capsule may be positioned in the chamber and the tests repeated at different portions along the well pipe until such time as another leak is located. The testing and/or repairing operation will then be repeated as described above.

The capsule C shown in FIGURES 1 to 4 is made of a frangible material such as hard vulcanized rubber, ceramic, or any molded plastics such as Bakelite. And it has compartments A and B in which a plastic sealant material and a catalyst are segregated from one another until time of use. Also, the capsule C may be constructed of a metal case with frangible ends and/or partitions to separate the plastic sealant from the catalyst. Preferably the capsule is made from a material which will shatter upon contact by the lance element 124 so that the catalyst and the plastic sealant material will quickly mix. The type of plastic sealant used depends upon the existing downwell conditions such as the magnitude of the leak, well temperature and well pressure at the site of leak, type of fluid being produced through the tubing, type of fluid contained in the space around the pipe such as mud and water, or the like. Plastic sealants which have been used as cellulose esters, e.g., cellulose acetate butyrate; polyurethane resins, e.g., from toluene diisocyanate and polypropylene glycol molecular weight 2025, or polyphenylene polyisocyanate (PAPI) and the polyester of adipic acid with diethylene glycol and trimethylol propane; and any of the phenolic resins such as phenolformaldehyde, cresol formaldehyde and phenol-furfural; epoxies, e.g., bisphenol A-epichlorhydrin resin; silicones, e.g., polydimethyl siloxane; and acrylates, e.g., polymerized methyl methacrylate and polymerized ethylacrylate. The catalysts used depend upon the particular sealant used. With cellulose acetate butyrate and phenolics, an acid type of catalyst such as hydrochloric acid or sulfuric acid is used. On the other hand, in addition to acid catalysts, an amine complex catalyst, e.g., boron-fluoride-triethyl amine can be used with the epoxies whereas a peroxide catalyst, e.g., benzoyl peroxide or cumene hydroperoxide is used with the acrylates. Fillers, such as wood flour, metallic powder, asbestos fiber, glass fiber, alpha cellulose, lignin, or cellophone shreds may be carried with the sealants.

FIGURE 6 illustrates a modified form of apparatus capable of accomplishing the method of the present invention. In the apparatus of FIGURE 6, the body structure 26' is substantially identical to the body structure 26 previously described in that it is provided with upper and lower packer elements 20 and 22 expansible by actuation of the pistons 48 and 42 respectively. However, the body structure 26' is not provided with an enlarged chamber for housing the capsule C. In the modification in FIGURE 6, after the test has been made on the section of well pipe and it has been determined that the same leaks, the pressure responsive valve assembly 79 of FIGURE 3 is removed from the bore 50 as previously described and a tubular member 200 is attached to its lower end. The tubular member 200 is provided with a passageway 202 which extends into an enlarged chamber 204 that houses a piercing or lance element 206 having a piston head 210. The enlarged chamber 204 also houses beneath the lance element 206 the frangible capsule C. A by-pass passage 212 is provided at the lower end of the enlarged chambed 204 and extends to a reduced opening outlet 214 of the chamber 204.

In the modification shown in FIGURE 6, it is not necessary to run a separate conduit into the conduit 24 in order to actuate the lance element 206. Once the tubular member with the lance element 204 and capsule C has been positioned as shown in FIGURE 6, the pump P is started and liquid is flowed down the conduit 24. The presure responsive valve assembly 79 initially prevents actuation of the lance element 206 but allows the liquid to flow in the conduit 64 so as to actuate the pistons 48 and 42 to expand the packer elements 20 and 22. Upon setting of the packer elements 20 and 22, pressure builds up in the conduit 24 and eventually forces the pressure responsive valve element 94 off of its seat so that liquid can flow through the passage 202 against the head of piston 210 to force the lance element 206 downwardly where it fractures the capsule C. Continued downward movement of the piston element completely crushes the capsule and when the piston 210 passes the by-pass 212, liquid flowing in the conduit 24 can by-pass through the passage 212 out of the opening 214 to force the mixture of sealant material and catalyst through the passage 52' out of the opening 54 and inject the same under pressure in the leak in the well pipe 12. Once the leak has been repaired, the pressure responsive valve assembly 79 with the attached tubular member 200 is removed from the conduit 24 by the overshot grapple 88 and the system is then flushed with the packers relaxed, as shown in FIGURE 1.

FIGURES 7 and 8 illustrated a further modification of the present invention and, more particularly, a modification to the means for fracturing or rupturing the capsule C. In FIGURE 7 the body structure 26" is identical with the body structure 26 with the exception that it is provided with a vertical bore 220 which extends downwardly from the chamber 62 and out of the lower end portion 34. The bore 220 has a portion of its length threaded, as indicated at 222, and is adapted to receive a threaded stem 224 of the lance element 226. The portion of the stem 24 which extends outwardly of the lower end portion 34 is provided with a drag spring assembly 228 having springs 230 which frictionally engage the side walls of the well pipe 12. After a leak has been located by operation of the apparatus 10" in a similar manner as described with respect to FIGURES 1, 2, and 3, the packer elements 20 and 22 are released as shown in FIGURE 7 and the conduit 24 is disconnected from the pump. Then the conduit 24 is rotated so as to rotate the body structure 26" relative to the threaded stem 224. This will cause the threaded stem to elevate the lance element 226 so that it penetrates and fractures the capsule C. As soon as the capsule has been penetrated, the pressure responsive valve assembly 79 is again lowered into the bore 50 and the conduit 24 is again connected to the pump P and liquid is flowed through the conduit to cause initial setting of the packer elements 20 and 22, as shown in FIGURE 8. After setting of the packer elements 20 and 22, the liquid pressure is increased to unseat the valve 94 so that liquid can flow through the passage 52 into the chamber 62 to force the plastic sealant material and catalyst mixture out of the opening 54 and into the leaks in the well pipe. After the leak has been repaired, the pressure responsive valve 79 may be fished out of the conduit 24 and water may be flowed through the body structure 26" to thereby flush out the inside mechanism of the apparatus and thus prevent any sealant left therein from fouling subsequent operation.

While the apparatus described above fully accomplishes the objects and advantages of the present invention, it is, of course, within the scope of the present invention that certain changes and modifications may be made without departing from the spirit of the invention. Therefore, the terminology used in this specification is for the purpose of description and not for limitation, as the scope of the invention is defined in the claims.

What is claimed is:

1. In an apparatus for testing well pipe in a well for leaks and repairing the same in situ: an elongated body structure of smaller diameter than the inside diameter of the well pipe; at least one upper and one lower fluid expansible packer element mounted exteriorly on the body structure in spaced relationship to each other, both of said packer elements having a relaxed diameter smaller than the inside diameter of the well pipe; means for supplying fluid under pressure through said body structure to said packer elements for causing said packer elements to set in sealing engagement with the wall of the well pipe; means in said body structure independent of said last-mentioned means for flowing a testing fluid under a measurable pressure through the body structure into the annular sealed off space for testing the well pipe for leaks; and means for carrying a batch of sealant with said body structure and supplying the same when needed through said last-mentioned means into the annular space between said packers.

2. The apparatus as claimed in claim 1 in which said last-mentioned means includes means to separately carry a plastic sealant and a catalyst therefor until such time the plastic sealant and catalyst are mixed.

3. The apparatus as claimed in claim 1 in which said means for carrying a sealant include a frangible capsule having the sealant therein and carried by said body structure and means for fracturing said capsule.

4. The apparatus as claimed in claim 3 including means to apply a presssure on the sealant in said capsule after said capsule is fractured.

5. The apparatus as claimed in claim 3 in which said capsule includes separate compartments, one of said compartments having a plastic sealant therein and the other of said compartments having a catalyst therein.

6. In an apparatus for testing well pipe in a well for leaks and repairing the same in situ: an elongated body structure of smaller diameter than the inside diameter of the well pipe; at least one upper and one lower fluid expansible packer element mounted exteriorly on the body structure in spaced relationship to each other, both of said packer elements having a relaxed diameter smaller than the inside diameter of the well pipe; means for supplying fluid under pressure through said body structure to expand said packer elements into sealing engagement with the wall of the well pipe to seal off a section of well pipe to be tested; means in said body structure independent of said last-mentioned means for flowing a testing fluid under a measurable pressure through the body structure into the annular sealed off space between the packer elements for testing the well pipe for leaks; a frangible capsule carried by said body structure within said means for flowing a testing fluid, said frangible capsule having a sealant therein; and means for fracturing said capsule for releasing the sealant therein into said means for flowing a testing fluid.

7. The apparatus as claimed in claim 6 in which said means for flowing the testing fluid includes a passage in said body structure and a pressure responsive valve in said passage operable to a higher pressure than pressure of fluid necessary to expand said packer elements; said passage in said body structure having an enlarged chamber therein for carrying said frangible capsule.

8. The apparatus as claimed in claim 7 in which said means for fracturing said capsule includes a lance elements movable in said chamber to pierce said capsule.

9. The apparatus as claimed in claim 7, in which said means for fracturing said capsule includes a lance element slidable in said chamber, said lance element having a piston head thereon subject to pressure of fluid flowing through said passage.

10. The apparatus as claimed in claim 7 in which said means for fracturing said capsule includes an elongated lance element threadedly receivable in said body structure and movable in said chamber; and means for rotating said lance element relative said body structure to advance the same in said chamber.

11. The apparatus as claimed in claim 10 wherein said last-mentioned means includes a drag spring assembly carried by said lance member exteriorly of said body structure, said drag spring assembly frictionally engaging the walls of the well pipe.

12. In an apparatus for testing well pipe in a well for leaks and repairing the same in situ: an elongated body structure of smaller diameter than the inside diameter of the well pipe, said body structure being adapted to be lowered into the well pipe; at least one upper and one lower fluid expansible packer element mounted exteriorly on the body structure in spaced relationship to each other, both of said packer elements having a relaxed diameter smaller than the inside diameter of the well pipe; means including a passage extending from the upper end of said body structure and terminating adjacent each of said packer elements for supplying a fluid under pressure to expand said packer elements into sealing engagement with the wall of the well pipe to seal off a section of well pipe to be tested; said body structure having an enlarged axial bore extending from its upper end downwardly and a second passage communicating with the lower end of said bore and opening on the surface of said body structure intermediate said spaced packer elements; a pressure responsive valve assembly carried in said bore, said assembly including a passageway therethrough and a pressure responsive valve in the passageway and operable at a predetermined pressure for flowing testing fluid through said second passage into the section of well pipe to be tested; a frangible capsule operatively carried by said tester body, said capsule having a sealant therein; and means for fracturing said capsule and flowing the sealant therein through said last-mentioned passage into the section of well pipe being tested when the same indicates a leak.

13. The apparatus as claimed in claim 12 in which said pressure responsive valve assembly includes an elongated neck portion having an enlarged end adapted to be grasped by an overshot grapple whereby said pressure responsive valve assembly may be removed while the apparatus is in stitu in the well pipe.

14. The apparatus as claimed in claim 12 wherein said second passage includes an enlarged chamber positioned intermediate said bore and the opening of the second passage on the surface of the body structure.

15. The apparatus as claimed in claim 12 in which said pressure responsive valve assembly is removable and replaceable by a second pressure responsive valve assembly having a passageway therethrough and an enlarged chamber in the passageway, said chamber being adapted to receive said capsule and said means for fracturing said capsule.

16. The apparatus as claimed in claim 12 in which said second passage includes an enlarged chamber therein carrying said capsule and in which said means for fracturing said capsule includes a lance element movable in said chamber.

17. The apparatus as claimed in claim 16 in which said lance element includes a piston head exposed to fluid pressure, said lance element extending partially through said second passage.

18. The apparatus as claimed in claim 16 in which said lance element includes a threaded stem and in which said body element includes a threaded bore extending to said chamber and adapted to receive the threaded stem of said lance element, said lance element being rotated relative said body structure to advance the same.

19. The apparaus as claimed in claim 18 in which said stem of said lance element extends out of said body element and includes a drag spring assembly for frictionally engaging the walls of the well pipe.

References Cited by the Examiner

UNITED STATES PATENTS

| | | | |
|---|---|---|---|
| 1,812,945 | 7/31 | Granger | 166—146 |
| 2,201,096 | 5/40 | Kerman | 166—14 |
| 2,248,169 | 7/41 | Granger | 166—146 |
| 2,431,751 | 12/47 | Hayward | 166—26 X |
| 2,804,147 | 8/57 | Pistole et al. | 166—14 |
| 3,097,698 | 7/63 | Corley et al. | 166—169 X |
| 3,139,931 | 7/64 | Simpson et al. | 166—21 X |

BENJAMIN HERSH, *Primary Examiner.*